United States Patent
Feng

(10) Patent No.: US 10,927,697 B2
(45) Date of Patent: Feb. 23, 2021

(54) TURBOGENERATOR SET

(71) Applicant: Yucheng Feng, Shanghai (CN)

(72) Inventor: Yucheng Feng, Shanghai (CN)

(73) Assignee: Yucheng Feng, Shanghai (CN)

( * ) Notice: Subject to any disclaimer, the term of this patent is extended or adjusted under 35 U.S.C. 154(b) by 0 days.

(21) Appl. No.: 16/607,014

(22) PCT Filed: Apr. 18, 2018

(86) PCT No.: PCT/CN2018/083561
§ 371 (c)(1),
(2) Date: Oct. 21, 2019

(87) PCT Pub. No.: WO2018/192525
PCT Pub. Date: Oct. 25, 2018

(65) Prior Publication Data
US 2020/0131925 A1  Apr. 30, 2020

(30) Foreign Application Priority Data

Apr. 22, 2017 (CN) .......................... 201710268314.3

(51) Int. Cl.
*F01D 15/10* (2006.01)
*H02K 7/18* (2006.01)

(52) U.S. Cl.
CPC .......... *F01D 15/10* (2013.01); *H02K 7/1823* (2013.01)

(58) Field of Classification Search
CPC .......... F01D 15/10; F01K 13/00; F01K 11/02; H02K 7/1823
See application file for complete search history.

(56) References Cited

U.S. PATENT DOCUMENTS 2,902,831 A * 9/1959 Ipsen ..................... F01K 3/22
60/656
4,316,362 A * 2/1982 Ninomiya ............. F01D 13/003
60/646
(Continued)

FOREIGN PATENT DOCUMENTS

CN      101042058 A      9/2007
CN      102230398 A  *  11/2011
(Continued)

OTHER PUBLICATIONS

CN-102230398-A English Translation (Year: 2011).*
(Continued)

*Primary Examiner* — Shafiq Mian
(74) *Attorney, Agent, or Firm* — Morgan, Lewis & Bockius LLP

(57) ABSTRACT

Provided is a turbogenerator set including a boiler, a steam turbine unit, a generator unit, a superheater, and a reheater in a body of the boiler, a header connection region corresponding to a steam inlet header and a steam outlet header for the superheater and the reheater on the body of the boiler, and pipes connecting the boiler to a high-pressure cylinder and to a medium-pressure cylinder, and transmitting a high-temperature and high-pressure steam. The steam turbine unit is disposed at an outer side of the boiler body adjacent to the header connection region, and an axis of the steam turbine unit vertically point to the boiler body, vertically arranged on a high level; that is, the steam turbine unit is vertically arranged on a high level.

10 Claims, 13 Drawing Sheets

(56) References Cited

U.S. PATENT DOCUMENTS

| | | | | |
|---|---|---|---|---|
| 2008/0010968 A1* | 1/2008 | Hartmann | ............. | F01K 7/22 60/39.182 |
| 2008/0245071 A1* | 10/2008 | Kawakami | ............. | F01K 7/40 60/670 |
| 2010/0038917 A1* | 2/2010 | DiAntonio | ............. | F01K 7/22 290/4 C |
| 2011/0120130 A1* | 5/2011 | Mishima | ............. | F01K 7/22 60/660 |
| 2014/0208749 A1* | 7/2014 | Murakami | ......... | B01D 53/1425 60/645 |
| 2014/0283518 A1* | 9/2014 | Majumdar | ............. | F01K 7/22 60/677 |
| 2015/0260055 A1* | 9/2015 | Ishiguro | ............. | F01D 25/24 165/51 |
| 2016/0320052 A1* | 11/2016 | Nakaharai | ............. | F22B 37/12 |

FOREIGN PATENT DOCUMENTS

| | | | |
|---|---|---|---|
| CN | 102251817 A | | 11/2011 |
| CN | 106948880 A | | 7/2017 |
| CN | 207093150 U | | 3/2018 |
| JP | 2010043562 A | * | 2/2010 |

OTHER PUBLICATIONS

JP-2010043562-A English Translation (Year: 2010).*
International Search Report for Application No. PCT/CN2018/083561, dated Jun. 28, 2018, 4 pages.

* cited by examiner

Direction B

TURBOGENERATOR SET

CROSS-REFERENCE TO RELATED APPLICATIONS

This application is a United States national phase application of co-pending international patent application number PCT/CN2018/083561 filed on Apr. 18, 2018 which claims the priority of China patent application No. 2017102683143 filed on Apr. 22, 2017 with China Intellectual Property Administration, disclosures of both of which are incorporated herein by reference in their entireties.

TECHNICAL FIELD

The present disclosure relates to the technical field of electricity generation, for example, relates to a turbogenerator set.

BACKGROUND

As the core equipment of thermal power plants, turbogenerator sets have an important impact on the overall efficiency and economy of the thermal power plant. In recent years, along with the continuing rise of fuel prices and continuous lift of energy-conservation and environmental-protection requirements, how to improve the efficiency of turbogenerator sets has become a common concern of many countries in the world. Under such a background, continuously improving the steam parameters of the turbogenerator set and improving the unit's reheating times thereby improving the cycle efficiency of the unit has become the main development direction of the turbogenerator set.

In terms of improving the steam parameters, the thermal power generating units have undergone a process from subcritical to supercritical all the way up to ultra-supercritical. The main steam pressure, main steam temperature, and reheated steam temperature of a typical ultra-supercritical unit have been upgraded to 25 MPa/600° C./600° C. With the continuing development of material science and thermal power technologies, the main steam pressure, the main steam temperature, and the reheated steam temperature of a thermal power generating unit are expected to further upgrade to 35 MPa/700° C./725° C. in the next 10 years. In terms of increasing the reheating times, the use of secondary reheating technology to improve the unit's efficiency is a technology that has been researched and applied since the 1950s. However, in the last few decades, this technology has not been widely applied due to factors such as low fuel costs. In recent years, however, with the increasingly stringent requirements for energy conservation and emission reduction of coal-fired thermal power units in the world, domestic and foreign power generation companies and power generation equipment manufacturers have begun to re-emphasize the secondary reheating technology and regard it as an important technical route for the future development of thermal power generating units. The increase in the steam parameters and the reheating times however will lead to a common problem, i.e., a significant increase of the investment in the steam pipes.

FIG. 1 is a schematic diagram showing a conventional arrangement using a 1000 MW-grade tower-type boiler 1 and a secondary reheating steam turbine unit in the related art. A high-pressure steam turbine 21, a first medium-pressure steam turbine 221, a second medium-pressure steam turbine 222, and a low-pressure steam turbine 23 of the steam turbine unit 2 are arranged in the form of a single shaft in the steam turbine room. Generally, a single main steam pipe 31 connecting from an outlet of a superheater 11 of boiler 1 to the high-pressure steam turbine 21 has a length of about 160 meters. A single high temperature primary reheating steam pipe 32 connecting from an outlet of a primary reheater 12 to a first medium-pressure steam turbine 221 has a length of about 190 meters. A high temperature secondary reheating steam pipe 33 connecting from an outlet of the secondary reheater 13 to a second medium-pressure steam turbine 222 has a length of about 190 meters. Due to the use of the secondary reheating technology, an additional high-temperature secondary reheating steam pipe 33 having a length of about 190 meters needs to be added to the system. This pipe, like the main steam pipe 31 and the high temperature primary reheating steam pipe 32, requires the use of the expensive 600° C.-level high temperature resistant alloy steel. Furthermore, with the continuing improvement of the steam parameters of future thermal power generating units, the main steam pipe 31, the high temperature primary reheating steam pipe 32 and the high temperature secondary reheating steam pipe 33 will all use alloy steel capable of withstanding higher temperatures, which will lead to further increases in the investment of in thermal power generating unit steam pipes.

SUMMARY

The present disclosure provides a turbogenerator set, which may prevent steam turbine equipment from bearing the torsion thrust and shortening the high-temperature and high-pressure steam pipes.

The present disclosure provides a turbogenerator set, the turbogenerator set includes: a boiler, the boiler comprises a boiler body and at least one primary superheater and at least one primary reheater disposed within the boiler body; each superheater and each reheater is individually provided with a steam inlet header and a steam outlet header, and the boiler body is provided with a header connection region corresponding to the steam inlet header and the steam outlet header; the boiler may be a tower-type boiler or a Π-shaped boiler;

a steam turbine unit, the steam turbine unit including at least one high-pressure steam turbine and at least one medium-pressure steam turbine, where the steam turbine unit is divided into a condensing steam turbine unit and a back-pressure steam turbine unit; the condensing steam turbine unit includes at least one high-pressure steam turbine, at least one medium-pressure steam turbine, and at least one low-pressure steam turbine; the back-pressure steam turbine unit includes at least one high-pressure steam turbine and at least one medium-pressure steam turbine; the condensing steam turbine unit and the back-pressure steam turbine unit may be common-shaft arranged or spilt-shaft arranged;

a generator unit, the generator unit includes at least one generator connected to the steam turbine unit; if the generator unit is spilt-shaft arranged, the generator unit includes at least a first generator connected to the at least one high-pressure steam turbine and at least a second generator connected to the at least one low-pressure steam turbine;

a steam pipe system, a steam inlet and a steam outlet of the steam turbine unit are connected to the steam inlet header and the steam outlet header of the superheater and the reheater through the steam pipe system; the steam pipe system at least includes a pipe for transmitting a working substance between the boiler and the high-pressure steam turbine, i.e., a main steam pipe; a pipe for transmitting the working substance between the boiler and the medium-pressure steam turbine, i.e., a high-temperature reheat steam pipe; the steam pipe system further includes a pipe for transmitting the working substance between the high-pressure steam turbine and the boiler, i.e., a primary low temperature reheating steam pipe; a pipe for transmitting the working substance between the medium-pressure steam turbine and the boiler, i.e., a secondary low temperature reheating steam pipe; and a common low temperature steam pipe; the steam turbine unit and the generator unit are disposed at an outer side of the boiler body adjacent to the header connection region, and the steam turbine unit and the generator unit are arranged in a high-level vertical manner, longitudinal axes of the steam turbine unit and the generator unit vertically point to an axis of the boiler body (a longitudinal axis of the steam turbine unit is perpendicular to an axis of a left-right oriented wall of the boiler).

In one embodiment, the turbogenerator set is common-shaft arranged, and the at least one high-pressure steam turbine, the at least one medium-pressure steam turbine and the at least one generator are arranged in a same shaft system.

In one embodiment, the turbogenerator set is spilt-shaft arranged, the generator unit includes a first generator and a second generator. The at least one high-pressure steam turbine and the first generator constitute a first shaft system, and the at least one medium-pressure steam turbine and the second generator constitute a second shaft system. The first shaft system and the second shaft system are arranged one above the other.

In one embodiment, the turbogenerator set is spilt-shaft arranged, and the generator unit includes a first generator and a second generator, the turbogenerator set includes a first medium-pressure steam turbine and a second medium-pressure steam turbine. The at least one high-pressure steam turbine, the first medium-pressure steam turbine and the first generator constitute a first shaft system. The second medium-pressure steam turbine, the low-pressure steam turbine and the second generator constitute a second shaft system. The first shaft system and the second shaft system are arranged one above the other.

In one embodiment, the steam turbine unit further includes at least one low-pressure steam turbine.

In one embodiment, the turbogenerator set is common-shaft arranged, and the at least one high-pressure steam turbine, the at least one medium-pressure steam turbine, the at least one low-pressure steam turbine and the at least one generator are arranged in a same shaft system.

In one embodiment, the turbogenerator set is spilt-shaft arranged, the generator includes a first generator and a second generator. The at least one high-pressure steam turbine, the at least one medium-pressure steam turbine and the first generator constitute a first shaft system. And the at least one low-pressure steam turbine and the second generator constitute a second shaft system. The first shaft system and the second shaft system are arranged one above the other.

In one embodiment, the turbogenerator set is spilt-shaft arranged, the generator includes a first generator and a second generator. The at least one high-pressure steam turbine and the first generator constitute a first shaft system. The at least one medium-pressure steam turbine, the at least one low-pressure steam turbine and the second generator constitute a second shaft system. The first shaft system and the second shaft system are arranged one above the other.

In one embodiment, the turbogenerator set is spilt-shaft arranged, and the steam turbine unit includes a first medium-pressure steam turbine and a second medium-pressure steam turbine, and the generator unit includes a first generator and a second generator. The at least one high-pressure steam turbine, the first medium-pressure steam turbine and the first generator constitute a first shaft system. And the second medium-pressure steam turbine, the low-pressure steam turbine and the second generator constitute a second shaft system. The first shaft system and the second shaft system are arranged one above the other.

In one embodiment, the turbine generator unit is spilt-shaft arranged, and the steam turbine unit includes a first medium-pressure steam turbine and a second medium-pressure steam turbine, and the generator unit includes a first generator and a second generator. The at least one high-pressure steam turbine, the first medium-pressure steam turbine, the second medium-pressure steam turbine and the first generator constitute a first shaft system. And the low-pressure steam turbine and the second generator constitute a second shaft system. The first shaft system and the second shaft system are arranged one above the other.

The steam turbine unit provided by the present disclosure is able to reduce the length of the pipes for transmitting the high-temperature and high-pressure steam, and is able to eliminate the asymmetric torsion thrusts between interfaces on two sides of the steam turbine.

BRIEF DESCRIPTION OF DRAWINGS

FIG. 2b is a schematic diagram taken along direction A in FIG. 2a.

FIG. 2c is a schematic diagram taken along direction B in FIG. 2a.

FIG. 3b is a schematic diagram taken along direction A in FIG. 3a.

FIG. 4b is a schematic diagram taken along direction A in FIG. 4a.

FIG. 4c is a schematic diagram taken along direction B in FIG. 4a.

FIG. 5b is a schematic diagram taken along direction A in FIG. 5a.

FIG. 5c is a schematic diagram taken along direction B in FIG. 5a.

FIG. 6b is a schematic diagram taken along direction A in FIG. 6a.

FIG. 7b is a schematic diagram taken along direction A in FIG. 7a.

FIG. 8b is a schematic diagram taken along direction A in FIG. 8a.

FIG. 8c is a schematic diagram taken along direction B in FIG. 8a.

FIG. 9b is a schematic diagram taken along direction A in FIG. 9a.

FIG. 9c is a schematic diagram taken along direction B in FIG. 9a.

FIG. 10b is a schematic diagram taken along direction A in FIG. 10a.

FIG. 11b is a schematic diagram taken along direction A in FIG. 11a.

FIG. 12b is a schematic diagram taken along direction A in FIG. 12a.

REFERENCE NUMERALS IN THE DRAWINGS

Figure 1:
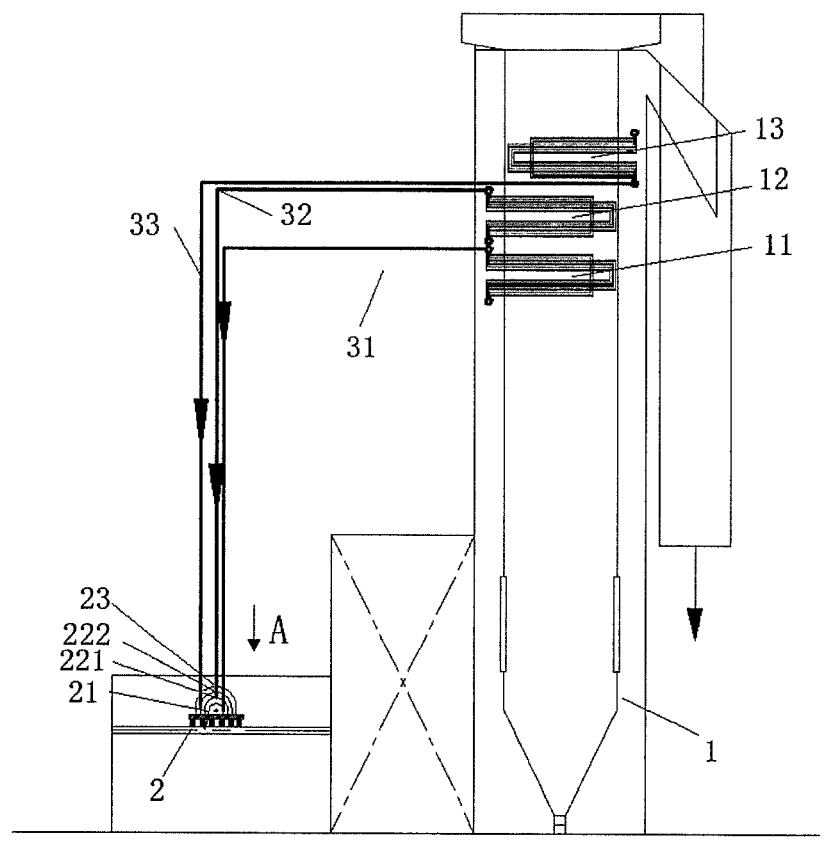
FIG. 1 is a schematic diagram of a conventional arrangement of a tower-type boiler and a secondary reheat steam turbine unit in the related art.

1—Boiler; 11—Superheater; 12—Primary reheater; 13—Secondary reheater; 14—Header connection region; 2—Steam turbine unit; 21—High-pressure steam turbine; 22—Medium-pressure steam turbine; 221—First medium-pressure steam turbine; 222—Second medium-pressure steam turbine; 23—Low-pressure steam turbine; 3—Steam pipe system; 31—Main steam pipe; 32—Primary reheating steam pipe; 33—Secondary reheating steam pipe; 4—Generator; 41—First generator; and 42—Second generator.

DETAILED DESCRIPTION

Embodiments provide an arrangement of a new turbogenerator set. Compared with the conventional turbogenerator set arrangement, the method places a dual-shaft turbogenerator set around a superheater outlet header of a boiler, so that a connection pipe between the boiler and the steam turbine is short enough. See FIG. 2. One shaft of the steam turbine includes a high-pressure steam turbine 21, a first medium-pressure steam turbine 221 and generator 41; and another shaft includes a second medium-pressure steam turbine 222, a low-pressure steam turbine 23 and a generator 42. A high-temperature steam connection pipe between the boiler and the steam turbine includes: a main steam pipe 31, a primary reheating steam pipe 32, and a secondary reheating steam pipe 33.

Figure 2A:
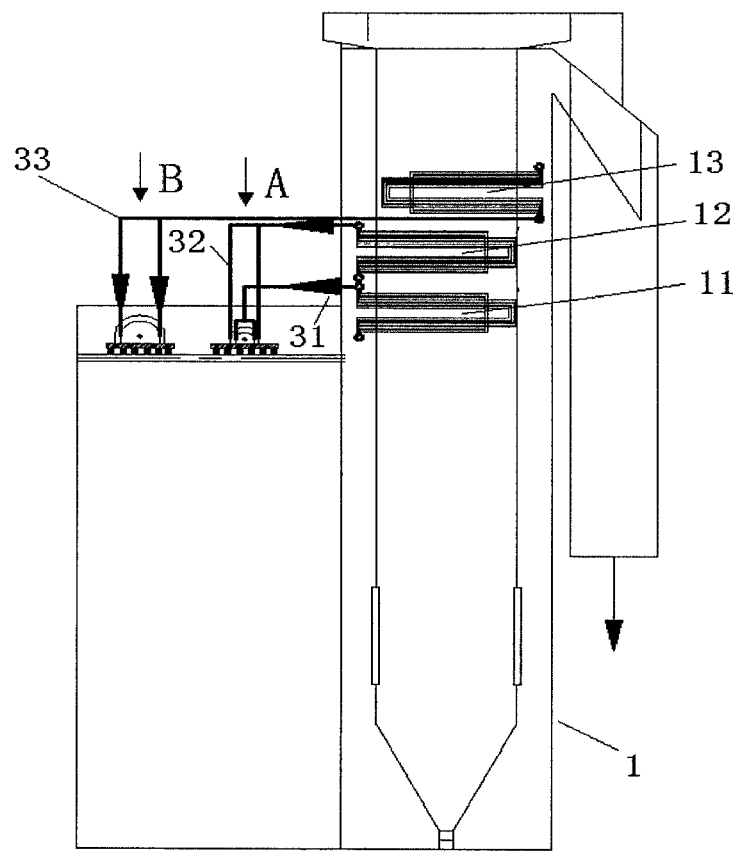
FIG. 2a is a schematic diagram of a dual-shaft turbogenerator set according to an embodiment of the present disclosure.
Figure 2B:
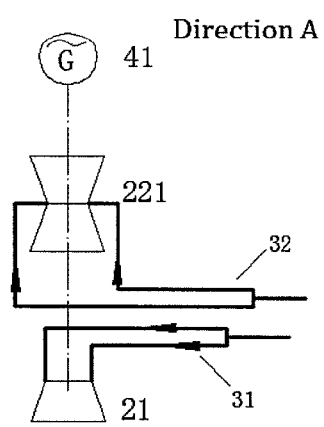
Figure 2C:
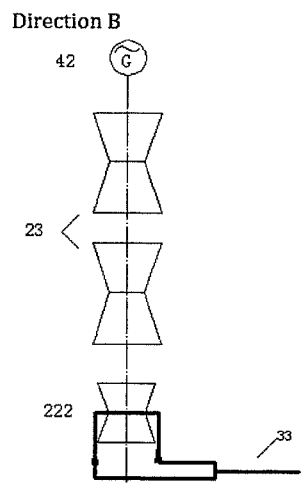

In a dual shaft steam turbine generator system as shown in FIG. 2, although the dual shaft steam turbine generator is placed around the superheater outlet header of the boiler, the steam turbine and the boiler room in the system are arranged in parallel. This will cause left and right inlet pipes of the high-pressure steam turbine 21, the first medium-pressure steam turbine 221 and the second medium-pressure steam turbine 222 of the steam turbine to be asymmetric with respect to the turbine's longitudinal axis, which may generate a torsion thrust that may be unacceptable to the turbine devices. In this case, when the main steam pipe 31, the primary reheating steam pipe 32, and the secondary reheating steam pipe 33 are designed, the pipe is wound to meet requirements of the pipe allowable stress and the turbine interface thrusts, which will cause the main steam pipe 31, the primary reheating steam pipe 32, and the secondary reheating steam pipe 33 to be prolonged, so that the arrangement effect greatly deteriorates.

With the continuous improvement of steam parameters of the thermal power generating unit and continuous increasing of the reheating times, the investment of the high-temperature steam pipe connecting the boiler and the steam turbine will rise significantly. Therefore, how to effectively shorten the length of main steam pipes and the reheating steam pipe, and reduce the investment in the thermal power generating unit pipes has become a key issue which affects the future development of the thermal power generating units.

Embodiment One

Figure 3A:
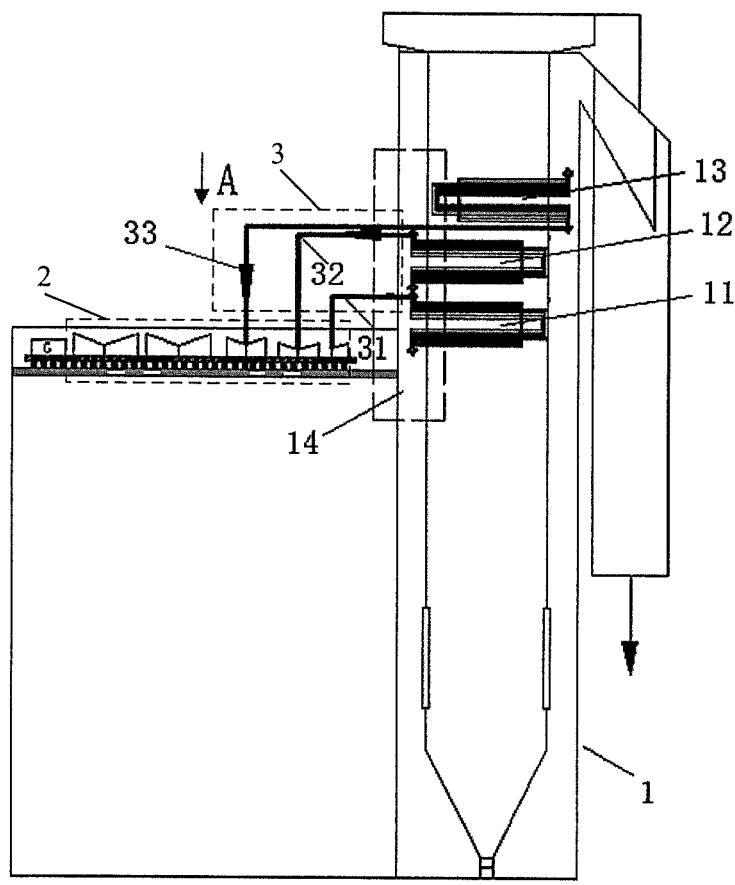
FIG. 3a is a schematic diagram of an arrangement of a turbogenerator set according to an embodiment of the present disclosure.
Figure 3B:
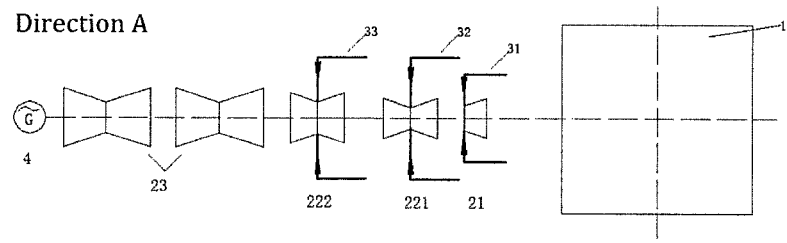

FIGS. 3a and 3b are schematic diagrams of an arrangement scheme of a common-shaft arranged secondary reheating supercritical condensing steam turbine unit of a boiler which is a tower-type boiler provided by the embodiment. The steam turbine unit is five-steam turbine four-steam-discharge, and one high-pressure steam turbine 21, one first medium-pressure steam turbine 221, one second medium-pressure steam turbine 222 and two low-pressure steam turbines 23 are provided. Design parameters of the steam turbine unit may be 28 MPa/600° C./600° C./600° C.

A supercritical turbine generator unit of the embodiment includes: a boiler 1, which is a tower-type boiler, including a boiler body and a superheater 11 in the boiler body and two reheaters 12 and 13; each superheater and each reheater is individually provided with a steam inlet and a steam outlet and forms a steam inlet header and a steam outlet header according to a common mode in the related art, and the boiler body is provided with a header connection region 14 corresponding to the steam inlet header and the steam outlet header; a steam turbine unit 2, which includes the high-pressure steam turbine 21 and the first medium-pressure steam turbine 221, the second medium-pressure steam turbine 222 and two low-pressure steam turbines 23; the generator unit includes a generator 4; a steam pipe system 3, which includes a main steam pipe 31 for transmitting a high-temperature and high-pressure steam and connecting an outlet of the superheater 11 of the boiler 1 and the high-pressure steam turbine 21; a high-temperature primary reheat steam pipe 32 connecting an outlet of a primary reheater 12 and the first medium-pressure steam turbine 221; and a high-temperature secondary reheating steam pipe 33 connecting an outlet of the secondary reheater 13 and the second medium-pressure steam turbine 222; and further includes a common low temperature steam pipe connecting the second medium-pressure steam turbine 222 and the two low-pressure steam turbines 23. The main steam pipe 31, the high-temperature primary reheat steam pipe 32 and the high-temperature secondary reheating steam pipe 33 use a 600° C.-grade high-temperature resistant alloy steel.

As illustrated in FIG. 3a, a steam turbine unit shaft system is disposed at an outer side of the boiler body and leans on the header connection region 14.

As illustrated in FIG. 3b, a longitudinal axis of the steam turbine unit vertically points to the boiler body of the boiler 1 in the embodiment.

According to this arrangement, the high-temperature and high-pressure steam from an outlet of the superheater 11 of the boiler 1 enters the high-pressure steam turbine 21 through the main steam pipe 31, exhaust steam of the high-pressure steam turbine 21 is returned to the primary reheater 12 to be heated through the primary reheat steam pipe. The heated high-temperature primary reheat stem is sent to the first medium-pressure steam turbine 221 through the high-temperature primary reheat steam pipe 32. The low temperature secondary reheated steam after work is returned to the boiler 1 through the low-temperature secondary reheating steam pipe. The high-temperature second-time reheat steam heated by the secondary reheater 13 enters the second medium-pressure steam turbine 222 through the high-temperature secondary reheating steam pipe 33. The steam after the working enters the low-pressure steam turbine 23 through a middle-low-pressure connection pipe to continuously work and generate power.

Since the steam turbine unit is disposed adjacent to the header connection region 14 and the longitudinal axis of the steam turbine unit vertically points to the boiler body of the boiler 1, on the premise that requirements of the pipe allowable stress and the turbine interface thrust are met, a high-temperature steam pipe system with three loops: the main steam pipe 31, the high-temperature primary reheat steam pipe 32, and the high-temperature secondary reheating steam pipe 33 in the related art are greatly shortened.

The high-temperature and high-pressure steam from the superheater in the boiler enters the high-pressure steam turbine through the high-temperature and high-pressure steam pipe, after the high-temperature and high-pressure steam works, the exhaust steam of the high-pressure steam turbine enters the reheater to be heated and generates high-temperature reheated steam. The high-temperature reheated steam is exhausted after the high-temperature reheated steam enters the medium-pressure steam turbine and works. Since the turbogenerator set disposes the steam turbine unit at the outer side of the boiler body and adjacent to the header connection region, and the longitudinal axis of the steam turbine unit vertically points to the boiler body, the length of the high-temperature and high-pressure steam in the steam pipe system is significantly shortened, and meanwhile, asymmetric torsion thrusts of interfaces on two sides of the steam turbine are eliminated.

With respect to the steam pipe system, the investment costs in the high-temperature and high-pressure steam pipe of the generator unit arranged in the high-level vertical manner. And as far as the steam amount stored in the reheat system, as illustrated in FIG. 3a, the steam turbine unit of the embodiment may reduce the steam storage amount in a secondary reheating system in the conventional arrangement, so that the regulation performance of the generator unit provided by the embodiment is equivalent to that of a conventional primary reheat generator unit. In addition, the asymmetric torsion thrusts of the interfaces on two sides of the steam turbine are also able to be eliminated and operational safety of the steam turbine is improved.

Embodiment Two

Figure 4A:
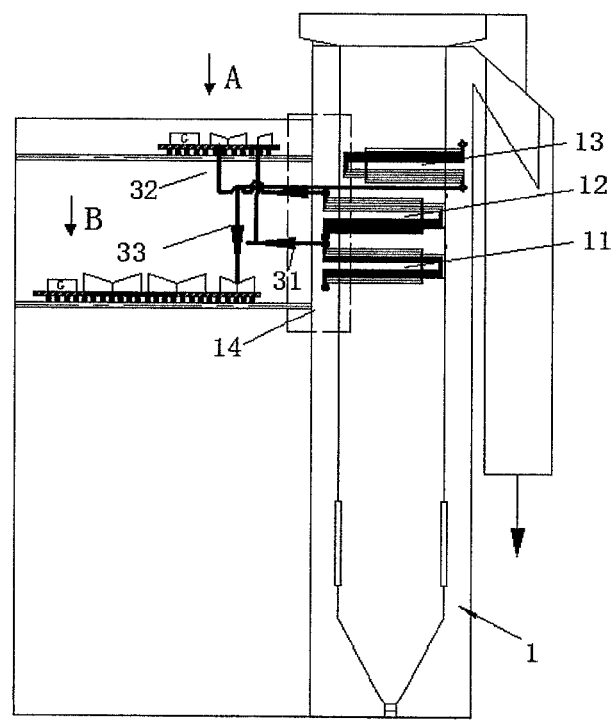
FIG. 4a is a schematic diagram of an arrangement of a turbogenerator set according to another embodiment of the present disclosure.
Figure 4B:
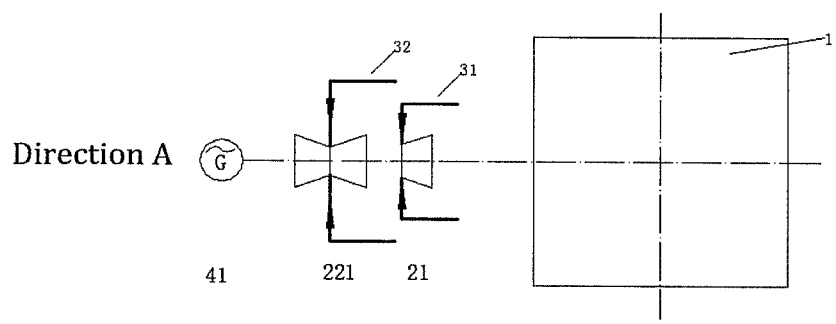
Figure 4C:
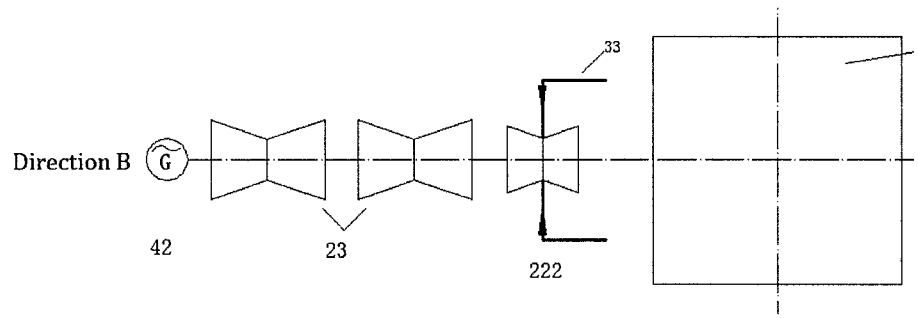

FIGS. 4a, 4b and 4c are schematic diagrams of an arrangement of a turbogenerator set according to the embodiment. The difference between the embodiment and the embodiment one is that the turbogenerator set is spilt-shaft arranged. The steam turbine unit 2 is divided into an upper shaft system including a high-pressure steam turbine 21 and a first medium-pressure steam turbine 221 and a lower shaft system including a second medium-pressure steam turbine 222 and two low-pressure steam turbines 23. The upper shaft system and the lower shaft system are disposed at the outer side of the boiler adjacent to a header connection region 14. The spacing between the upper shaft system and the lower shaft system meets the lower shaft system arrangement requirements. Technical effects obtained by such layout design is that the lengths of a main steam pipe 31, a primary reheating steam pipe 32 and a secondary reheating steam pipe 33 in the steam pipe are greatly shortened, and the investment of the high-temperature and high-pressure steam pipe system is greatly reduced. The steam turbine unit 2 in the embodiment is spilt-shaft arranged, thereby reducing the steam turbine shaft system length and helping to reduce the steam turbine shaft seal steam leakage.

Embodiment Three

Figure 5A:
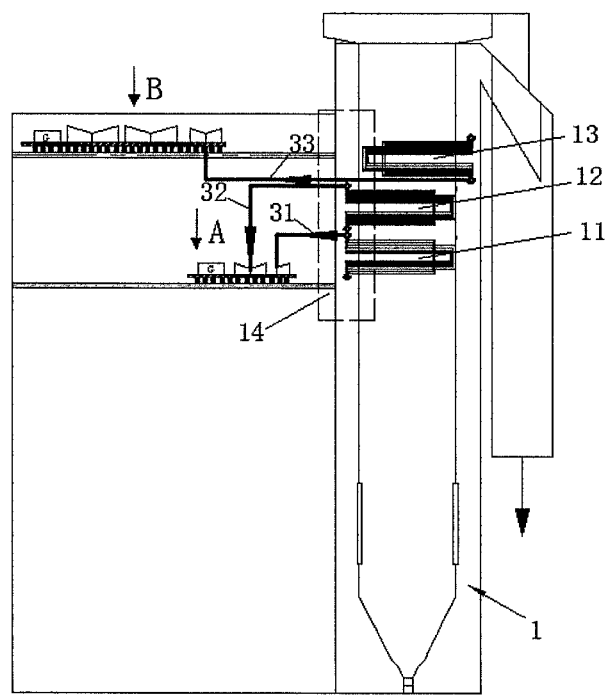
FIG. 5a is a schematic diagram of an arrangement of a turbogenerator set according to another embodiment of the present disclosure.
Figure 5B:
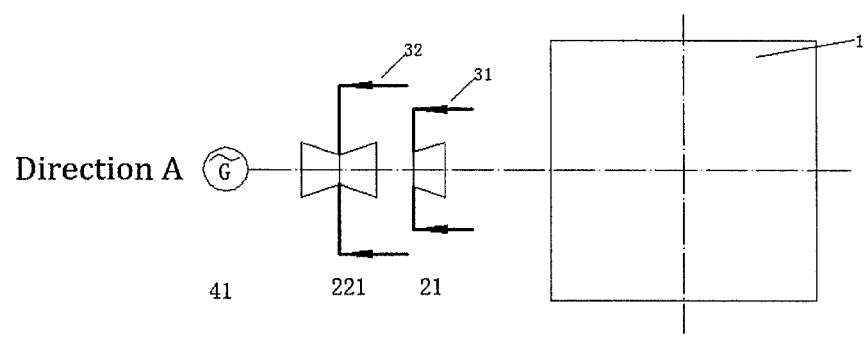
Figure 5C:
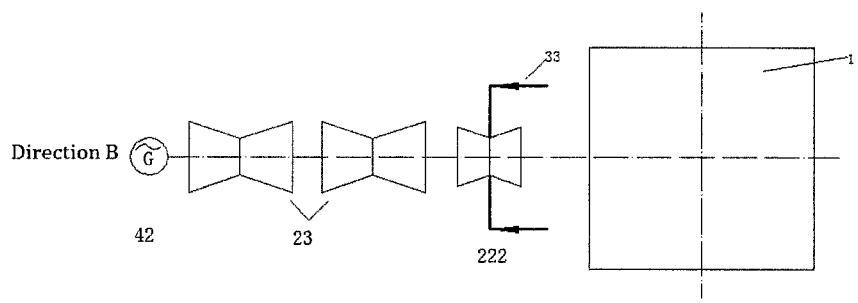

FIGS. 5a, 5b and 5c are schematic diagrams of an arrangement of a turbogenerator set according to the embodiment. The difference between the embodiment and the embodiment one is that the turbogenerator set is spilt-shaft arranged. The steam turbine unit 2 is divided into a lower shaft system including a high-pressure steam turbine 21 and a first medium-pressure steam turbine 221 and an upper shaft system including a second medium-pressure steam turbine 222 and two low-pressure steam turbines 23. The upper shaft system and the lower shaft system are disposed at the outer side of the boiler adjacent to a header connection region 14. The spacing between the upper shaft system and the lower shaft system meets the lower shaft system arrangement requirements. Technical effects obtained by such layout design is that the lengths of a main steam pipe 31, a primary reheating steam pipe 32 and a secondary reheating steam pipe 33 in the steam pipe are greatly shortened, and the investment in the high-temperature and high-pressure steam pipe system is greatly reduced. Compared with the embodiment two, in the embodiment, since the steam outlet header of the boiler superheater and the primary reheat steam outlet header are mostly arranged below, and the secondary reheating steam outlet header is arranged above. Therefore, the second medium-pressure steam turbine and the low-pressure steam turbines are taken as the upper shaft system, and the high-pressure steam turbine and the first medium-pressure steam turbine are taken as the lower shaft system, so that in the arrangement the main steam pipe, the primary reheat steam pipe and the secondary reheating steam pipe are shorter. However, to enable the exhaust pipe of the low-pressure steam turbine to be directly connected to the condenser below, the high level machine building is relatively longer, and the low-pressure steam turbine exhaust pipe is relatively longer.

Embodiment Four

Figure 6A:
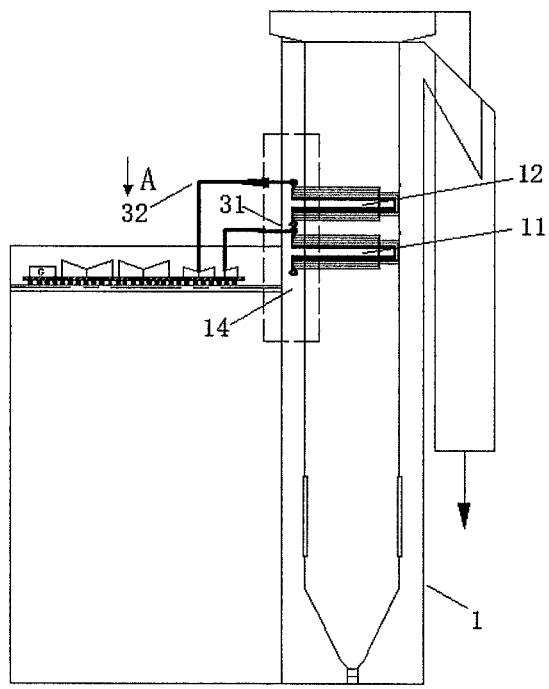
FIG. 6a is a schematic diagram of an arrangement of a turbogenerator set according to another embodiment of the present disclosure.
Figure 6B:
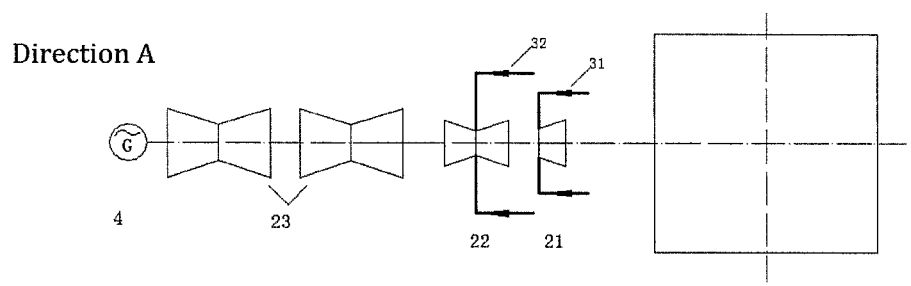

FIGS. 6a and 6b are schematic diagrams of an arrangement of a turbogenerator set according to the embodiment. The difference between the embodiment and the embodiment one is that the embodiment provides a primary reheat supercritical turbogenerator set. The difference between the structure in the embodiment and the embodiment one is that: a turbogenerator set 2 includes a high-pressure steam turbine 21, a medium-pressure steam turbine 22, two low-pressure steam turbines 23 and a generator 4. Technical effects obtained by such layout design is that the lengths of a main steam pipe 31 and a reheat steam pipe 32 in a steam pipe system 3 are greatly shortened, and the investment of the high-temperature and high-pressure steam pipe system is greatly reduced.

Embodiment Five

Figure 7A:
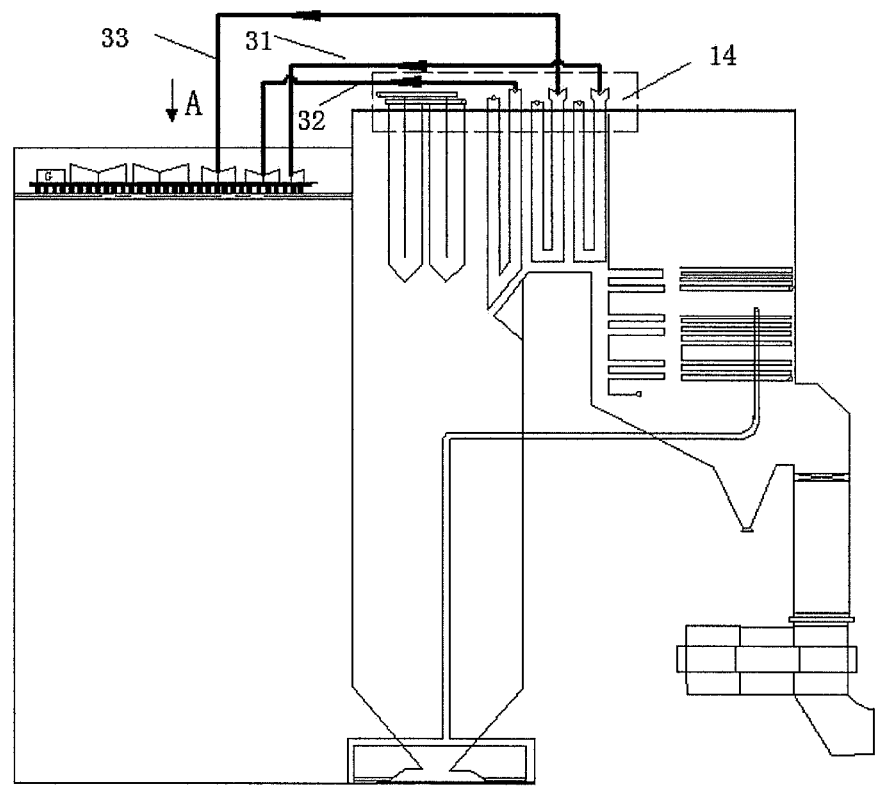
FIG. 7a is a schematic diagram of an arrangement of a turbogenerator set according to another embodiment of the present disclosure.
Figure 7B:
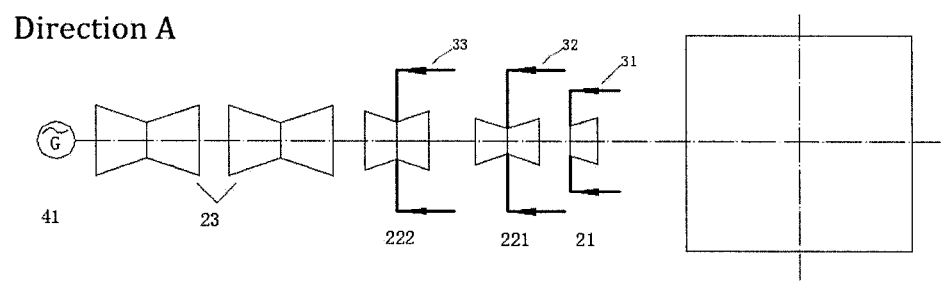

FIGS. 7a and 7b are schematic diagrams of an arrangement of a turbogenerator set according to the embodiment. The difference between the embodiment and the embodiment one is that the turbogenerator set provided by the embodiment is applied to a Π-shaped boiler. A turbogenerator set 2 in the embodiment is consistent with the embodiment 1. Technical effects obtained by such layout design is that the lengths of a main steam pipe 31, a primary reheating steam pipe 32 and a secondary reheating steam pipe 33 in the steam pipe system are greatly shortened, and the investment of the high-temperature and high-pressure steam pipe system is greatly reduced.

Embodiment Six

Figure 8A:
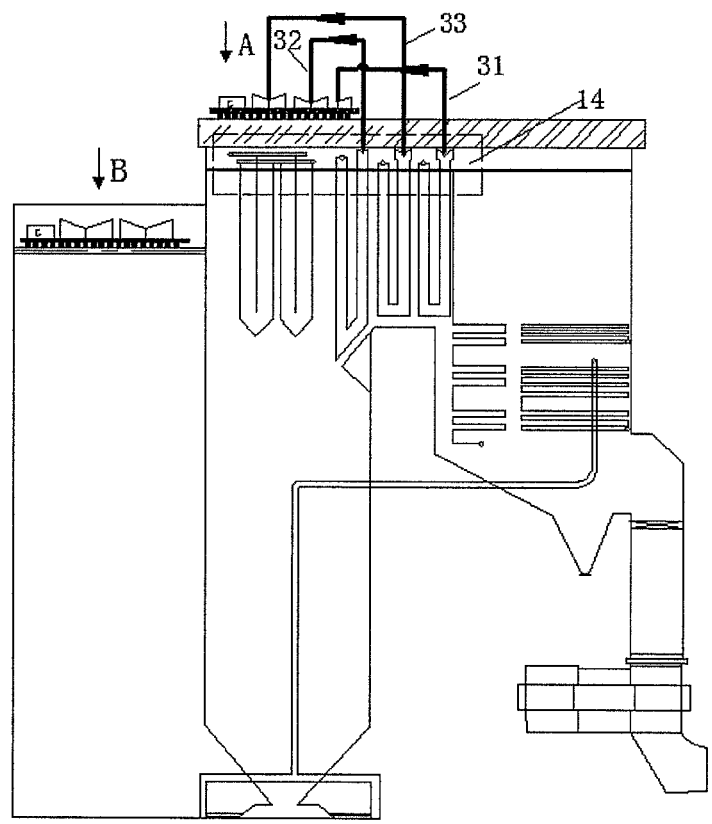
FIG. 8a is a schematic diagram of an arrangement of a turbogenerator set according to another embodiment of the present disclosure.
Figure 8B:
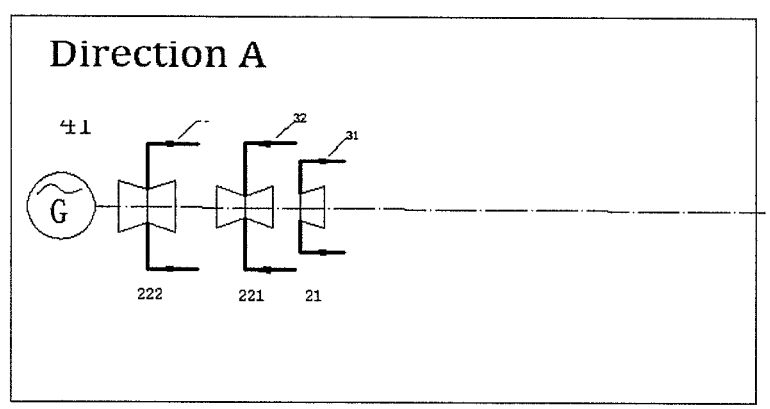
Figure 8C:
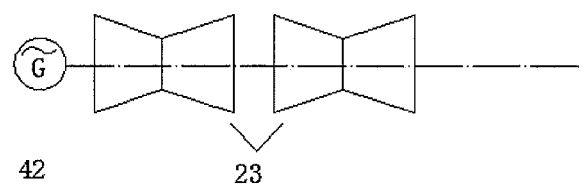

FIGS. 8a and 8b are schematic diagrams of an arrangement of a turbogenerator set according to the embodiment. The difference between the embodiment and the embodiment one is that the turbogenerator set provided by the embodiment is applied to a Π-shaped boiler and the turbogenerator set is spilt-shaft arranged. The steam turbine unit 2 is divided into an upper shaft system including a high-pressure steam turbine 21, a first medium-pressure steam turbine 221 and a second medium-pressure steam turbine 222, and a lower shaft system including two low-pressure steam turbines 23. The upper shaft system is arranged on the top platform of the boiler and adjacent to a header connection region 14, the lower shaft system is arranged on the side of the boiler room and adjacent to the header connection region 14. Technical effects obtained by such layout design is that the lengths of a main steam pipe 31, a primary reheating steam pipe 32 and a secondary reheating steam pipe 33 in the steam pipe system are greatly shortened, and the investment of the high-temperature and high-pressure steam pipe system is greatly reduced. The steam turbine unit 2 in the embodiment is spilt-shaft arranged, thereby reducing the steam turbine shaft system length and helping to reduce the steam turbine shaft seal steam leakage.

Embodiment Seven

Figure 9A:
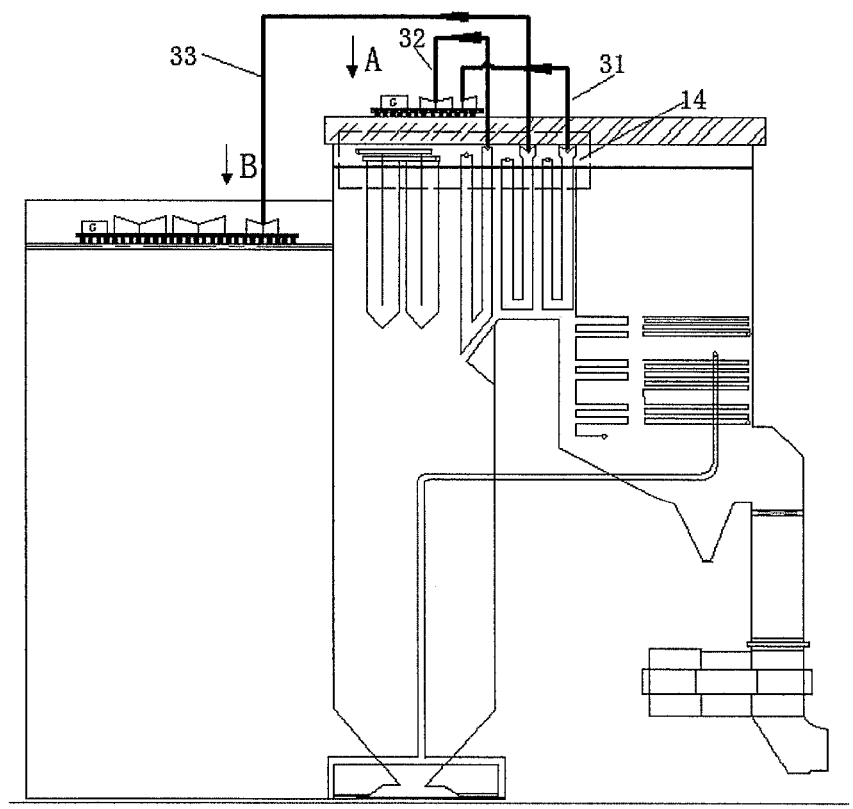
FIG. 9a is a schematic diagram of an arrangement of a turbogenerator set according to another embodiment of the present disclosure.
Figure 9B:
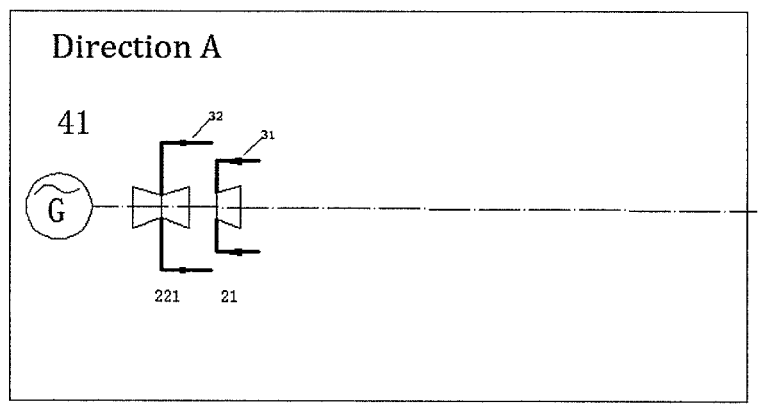
Figure 9C:
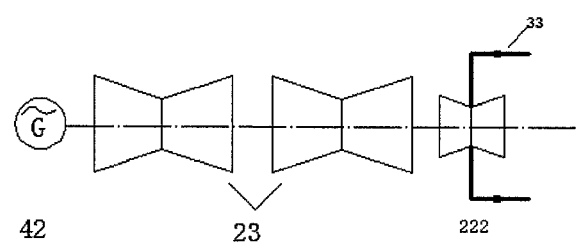

FIGS. 9a and 9b are schematic diagrams of an arrangement of a turbogenerator set according to the embodiment. The difference between the embodiment and the embodiment one is that the turbogenerator set provided by the embodiment is applied to a Π-shaped boiler and the turbogenerator set is spilt-shaft arranged. The steam turbine unit 2 is divided into an upper shaft system including a high-pressure steam turbine 21 and a first medium-pressure steam turbine 221 and a lower shaft system including a second medium-pressure steam turbine 222 and two low-pressure steam turbines 23. The upper shaft system is arranged on the top platform of the boiler and adjacent to a header connection region 14, the lower shaft system is arranged on the side of the boiler room and adjacent to the header connection region 14. Technical effects obtained by such layout design is that the lengths of a main steam pipe 31, a primary reheating steam pipe 32 and a secondary reheating steam pipe 33 in the steam pipe system are greatly shortened, and the investment of the high-temperature and high-pressure steam pipe system is greatly reduced. The steam turbine unit 2 in the embodiment is spilt-shaft arranged, thereby reducing the steam turbine shaft system length and helping to reduce the steam turbine shaft seal steam leakage.

Embodiment Eight

Figure 10A:
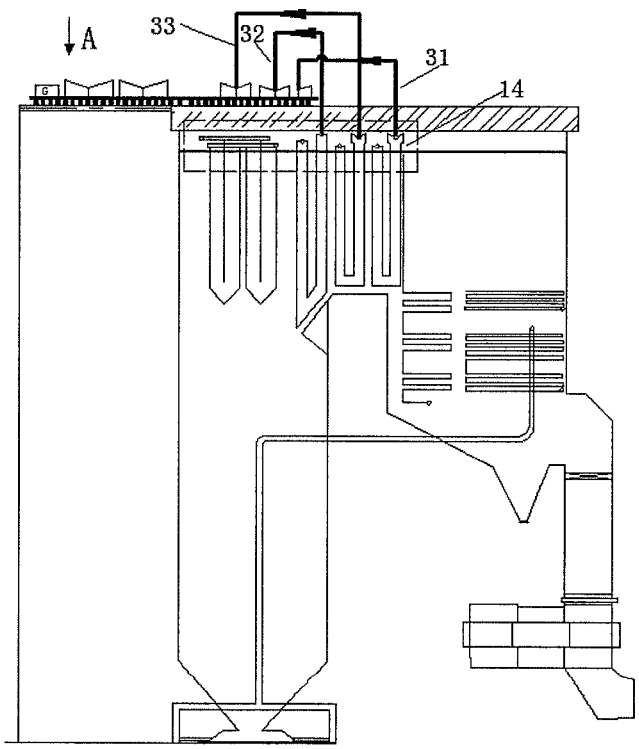
FIG. 10a is a schematic diagram of an arrangement of a turbogenerator set according to another embodiment of the present disclosure.
Figure 10B:
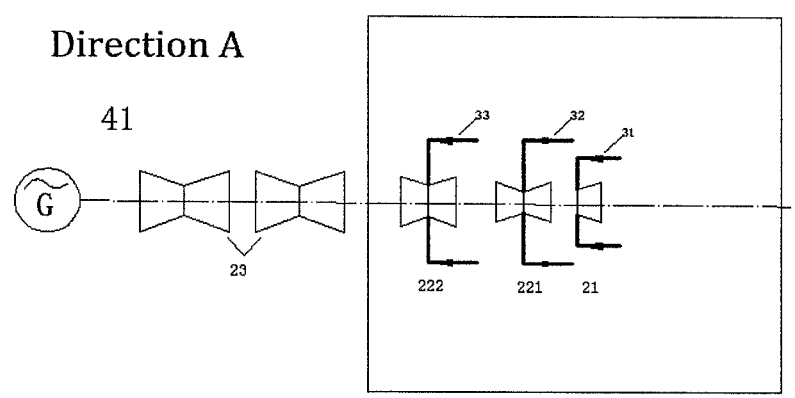

FIGS. 10a and 10b are schematic diagrams of an arrangement of a turbogenerator set according to the embodiment. The difference between the embodiment and the embodiment one is that the turbogenerator set provided by the embodiment is applied to a Π-shaped boiler. A steam turbine unit 2 includes a high-pressure steam turbine 21, a first medium-pressure steam turbine 221, a second medium-pressure steam turbine 222 and two low-pressure steam turbines 23. The steam turbine unit is common-shaft arranged, but the high-pressure steam turbine 21, the first medium-pressure steam turbine 221 and the second medium-pressure steam turbine 222 are located at the top of the boiler and adjacent to the header connection region 14. The low-pressure steam turbines 23 are located at the platform of the steam turbine building having a same height with the boiler room. Technical effects obtained by such layout design is that the lengths of a main steam pipe 31, a primary reheating steam pipe 32 and a secondary reheating steam pipe 33 in the steam pipe system are greatly shortened, and the investment of the high-temperature and high-pressure steam pipe system is greatly reduced. Meanwhile, the length of the steam turbine building is greatly reduced, thereby saving the building investment.

Embodiment Nine

Figure 11A:
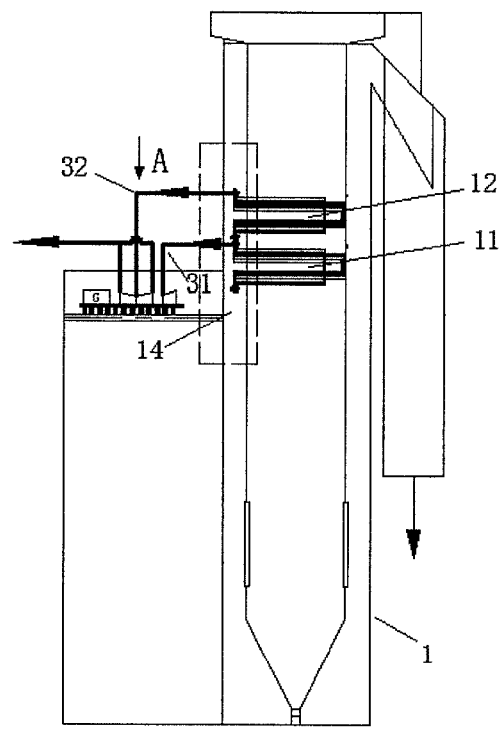
FIG. 11a is a schematic diagram of an arrangement of a turbogenerator set according to another embodiment of the present disclosure.
Figure 11B:
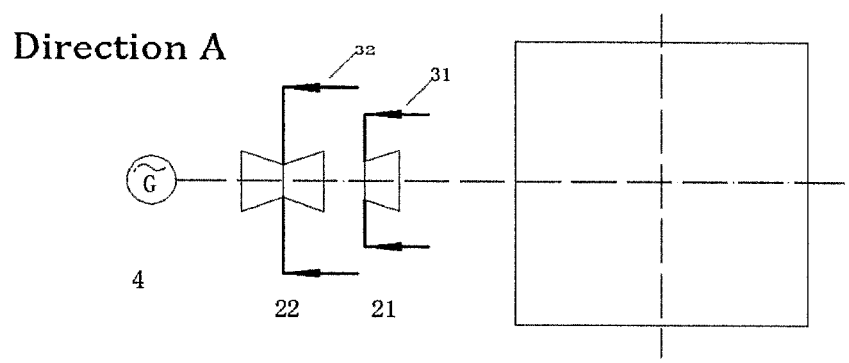

FIGS. 11a and 11b are schematic diagrams of an arrangement of a turbogenerator set according to the embodiment. The difference between the embodiment and the embodiment one is that the turbogenerator set provided by the embodiment is applied to a back-pressure turbogenerator set. In the embodiment, the turbogenerator set shaft system includes a high-pressure steam turbine 21, a medium-pressure steam turbine 22 and a generator 4. Exhaust steam of an outlet of the medium-pressure steam turbine 22 is directly sent to the user.

The embodiment has the following advantages and effects: the turbogenerator set is vertically arranged on a high level. On the premise that requirements of the pipe allowable stress and the turbine interface thrust are met, the length and system resistance of the high-temperature and high-pressure pipe are greatly reduced, the steam storage capacity of the reheat system and the regulation inertia of the turbogenerator set are reduced, and the investment of the high-temperature and high-pressure steam pipe system is greatly reduced.

Embodiment Ten

Figure 12A:
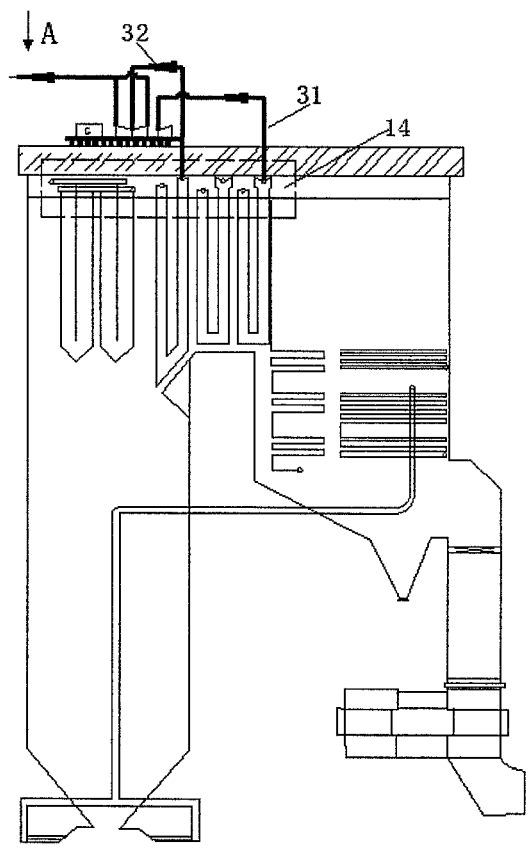
FIG. 12a is a schematic diagram of an arrangement of a turbogenerator set according to another embodiment of the present disclosure.
Figure 12B:
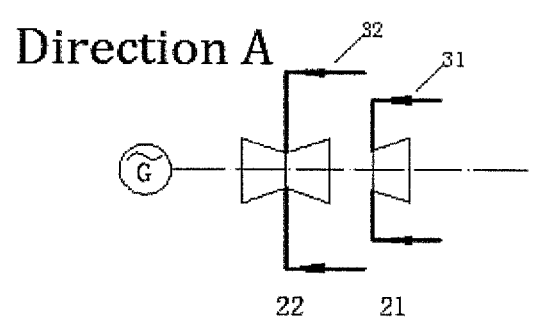

FIGS. 12a and 12b are schematic diagrams of an arrangement of a turbogenerator set according to the embodiment. The difference between the structure of the embodiment and that of the embodiment nine is that the boiler is a Π-shaped boiler. In the embodiment, the turbogenerator set shaft system includes a high-pressure steam turbine 21, a medium-pressure steam turbine 22 and a generator 4. Exhaust steam of an outlet of the medium-pressure steam turbine 22 is directly sent to the user.

The embodiment has the following advantages and effects: the turbogenerator set is vertically arranged on a high level. On the premise that requirements of the pipe allowable stress and the turbine interface thrust are met, the length and system resistance of the high-temperature and high-pressure pipe are greatly reduced, the steam storage capacity of the reheat system and the regulation inertia of the turbogenerator set are reduced, and the investment of the high-temperature and high-pressure steam pipe system is greatly reduced.

A condensing turbogenerator set is taken as an example. The boiler includes at least one primary superheater and at least one primary reheater. The steam turbine unit includes one high-pressure steam turbine, one low-pressure steam turbine and one generator. The high-pressure steam turbine, the low-pressure steam turbine and the generator are arranged in a same shaft system, i.e., common-shaft arranged.

The high-temperature and high-pressure steam from the superheater in the boiler enters the high-pressure steam turbine through the high-temperature and high-pressure steam pipe, after the high-temperature and high-pressure steam works, the steam exhausted from the high-pressure steam turbine enters the reheater to be heated through the low temperature reheat steam pipe, the generated reheat steam after the heat enters the medium-pressure steam turbine to work through the high-temperature and high-pressure steam pipe, the steam exhausted from the medium-pressure steam turbine enters the low-pressure steam turbine to continually work and be exhausted through the common low temperature steam pipe. Since the turbogenerator set disposes the steam turbine unit at an outer side of the boiler body and adjacent to the header connection region, and the longitudinal axis of the steam turbine unit vertically points to the boiler body, the lengths of the main steam pipe and the high-temperature and high-pressure steam pipe are greatly shortened, and meanwhile, asymmetric torsion thrusts of interfaces on two sides of the steam turbine are eliminated.

The condensing steam turbine unit may also be spilt-shaft arranged. The steam turbine unit includes an upper shaft system and a lower shaft system. The upper shaft system and the lower shaft system are disposed at the outer side of the boiler body and adjacent to the header connection region. The spacing between the upper shaft system and the lower shaft system meets the lower shaft system arrangement requirements. The high-pressure steam turbine may constitute the upper shaft system with a first generator, and the low-pressure steam turbine may constitute the lower shaft system with a second generator. The high-pressure steam turbine may also constitute the lower shaft system with the first generator, the low-pressure steam turbine may constitute the upper shaft system with the second generator, and the medium-pressure steam turbine may be arbitrarily arranged on the upper shaft system or the lower shaft system in combination with the high-pressure steam turbine or the low-pressure steam turbine.

A back-pressure turbogenerator set is taken as an example.

The back-pressure steam turbine unit may be common-shaft arranged. The steam turbine unit at least includes the high-pressure steam turbine, the medium-pressure steam turbine and the generator.

The back-pressure steam turbine unit may also be spilt-shaft arranged. The high-pressure steam turbine may constitute the upper shaft system with the first generator. The medium-pressure steam turbine may constitute the lower shaft system with the second generator; or the high-pressure steam turbine may constitute the upper shaft system with a first medium-pressure steam turbine in the medium-pressure steam turbine and the first generator, and a second medium-pressure steam turbine in the medium-pressure steam turbine and the second generator constitute the lower shaft system.

In the above embodiment of the present disclosure, the steam turbine unit shaft system is disposed at an outer side of the boiler body and leans on the header connection region, and a longitudinal axis of the steam turbine unit vertically points to the boiler body, so that the lengths of the main steam pipe and the high-temperature and high-pressure steam pipe are greatly shortened, thereby reducing the investment of the steam pipe, improving the thermal power generating unit economy, and meanwhile, asymmetric torsion thrusts of interfaces on two sides of the steam turbine are able to be eliminated and the operational safety of the steam turbine is improved.

Because the turbogenerator set provided by the present disclosure reduces the lengths of the reheat steam pipes, the pressure and heat loss of the high-pressure steam in the reheat steam pipes are also reduced, thereby improving the efficiency of the turbogenerator set, meanwhile reducing the amount of steam stored in the reheat system thereby significantly improving the regulatory inertia of the generator unit.

INDUSTRIAL APPLICABILITY

According to the present disclosure, the turbogenerator set provided herein is vertically arranged on a high level, thereby avoiding a torsion thrust generated by the pipe system to the interfaces of the steam turbine equipment. The present disclosure can significantly reduce the lengths, the pressure drop, and the heat loss of the steam pipe system, and reduce the amount of steam storage of the reheating system and reduce the regulatory inertia of the turbogenerator set, while satisfying the allowable stress of the steam pipes and the required thrust of the steam turbine.

What is claimed is:
1. A turbogenerator set, comprising:
   a boiler, comprising a boiler body and at least one primary superheater and at least one primary reheater disposed within the boiler body; wherein each of the at least one primary superheater and each of the at least one primary reheater individually comprises a steam inlet header and a steam outlet header, and the boiler body is provided with a header connection region corresponding to the steam inlet header and the steam outlet header;
   a steam turbine unit, comprising at least one high-pressure steam turbine and at least one medium-pressure steam turbine;
   a generator unit, comprising at least one generator connected to the steam turbine unit; and
   a steam pipe system, comprising at least pipes connecting the boiler to the at least one medium-pressure steam turbine and connecting the boiler to the at least one high-pressure steam turbine and configured to transport a high-temperature and high-pressure steam;
   wherein the steam turbine unit and the generator unit are arranged at an outer side of the boiler body adjacent to the header connection region, and the steam turbine unit and the generator unit are arranged in a high-level vertical manner, wherein longitudinal axes of the steam turbine unit and the generator unit vertically point to an axis of a left-right oriented wall of the boiler body.
2. The turbogenerator set of claim 1, wherein the turbogenerator set is common-shaft arranged, and wherein the at least one high-pressure steam turbine, the at least one medium-pressure steam turbine, and the at least one generator are arranged in a same shaft system.

3. The turbogenerator set of claim 1, wherein the turbogenerator set is spilt-shaft arranged, and the generator unit comprises a first generator and a second generator, wherein the at least one high-pressure steam turbine and the first generator constitute a first shaft system; the at least one medium-pressure steam turbine and the second generator constitute a second shaft system, wherein the first shaft system and the second shaft system are arranged one above the other.

4. The turbogenerator set of claim 1, wherein the turbogenerator set is spilt-shaft arranged, and the generator unit comprises a first generator and a second generator, the turbogenerator set comprises a first medium-pressure steam turbine and a second medium-pressure steam turbine, wherein the at least one high-pressure steam turbine, the first medium-pressure steam turbine, and the first generator constitute a first shaft system; the second medium-pressure steam turbine and the second generator constitute a second shaft system, wherein the first shaft system and the second shaft system are arranged one above the other.

5. The turbogenerator set of claim 1, wherein the turbogenerator set further comprises at least one low-pressure steam turbine.

6. The turbogenerator set of claim 5, wherein the turbogenerator set is common-shaft arranged, wherein the at least one high-pressure steam turbine, the at least one medium-pressure steam turbine, the at least one low-pressure steam turbine, and the at least one generator are arranged in a same shaft system.

7. The turbogenerator set of claim 5, wherein the turbogenerator set is spilt-shaft arranged, and the generator unit comprises a first generator and a second generator, wherein the at least one high-pressure steam turbine, the at least one medium-pressure steam turbine, and the first generator constitute a first shaft system; the at least one low-pressure steam turbine and the second generator constitute a second shaft system, wherein the first shaft system and the second shaft system are arranged one above the other.

8. The turbogenerator set of claim 5, wherein the turbogenerator set is spilt-shaft arranged, and the generator unit comprises a first generator and a second generator, wherein the at least one high-pressure steam turbine and the first generator constitute a first shaft system; the at least one medium-pressure steam turbine, the at least one low-pressure steam turbine, and the second generator constitute a second shaft system, wherein the first shaft system and the second shaft system are arranged one above the other.

9. The turbogenerator set of claim 5, wherein the turbogenerator set is spilt-shaft arranged, the turbogenerator set comprises a first medium-pressure steam turbine and a second medium-pressure steam turbine, the generator unit comprises a first generator and a second generator, wherein the at least one high-pressure steam turbine, the first medium-pressure steam turbine, and the first generator constitute a first shaft system; the second medium-pressure steam turbine, the at least one low-pressure steam turbine and the second generator constitute a second shaft system, wherein the first shaft system and the second shaft system are arranged one above the other.

10. The turbogenerator set of claim 5, wherein the turbogenerator set is spilt-shaft arranged, the turbogenerator set comprises a first medium-pressure steam turbine and a second medium-pressure steam turbine, the generator unit comprises a first generator and a second generator, wherein the at least one high-pressure steam turbine, the first medium-pressure steam turbine, the second medium-pressure steam turbine, and the first generator constitute a first shaft system; the at least one low-pressure steam turbine and the second generator constitute a second shaft system, wherein the first shaft system and the second shaft system are arranged one above the other.

\* \* \* \* \*